(12) United States Patent
Beck et al.

(10) Patent No.: US 10,334,460 B2
(45) Date of Patent: Jun. 25, 2019

(54) SYSTEM AND METHOD FOR PASSIVE INTERMODULATION SOURCE LOCALIZATION

(71) Applicant: CommScope Technologies LLC, Hickory, NC (US)

(72) Inventors: Andrew E. Beck, Ashburn, VA (US); Thomas B. Gravely, Herndon, VA (US)

(73) Assignee: CommScope Technologies, LLC, Hickory, NC (US)

( * ) Notice: Subject to any disclaimer, the term of this patent is extended or adjusted under 35 U.S.C. 154(b) by 57 days.

(21) Appl. No.: 15/527,316

(22) PCT Filed: Apr. 22, 2015

(86) PCT No.: PCT/US2015/027022
§ 371 (c)(1),
(2) Date: May 16, 2017

(87) PCT Pub. No.: WO2016/099593
PCT Pub. Date: Jun. 23, 2016

(65) Prior Publication Data
US 2018/0332487 A1    Nov. 15, 2018

Related U.S. Application Data

(60) Provisional application No. 62/093,822, filed on Dec. 18, 2014.

(51) Int. Cl.
H04W 24/06 (2009.01)
H04B 17/27 (2015.01)
H04B 17/345 (2015.01)
H04B 17/00 (2015.01)

(52) U.S. Cl.
CPC ........ *H04W 24/06* (2013.01); *H04B 17/0085* (2013.01); *H04B 17/27* (2015.01); *H04B 17/345* (2015.01)

(58) Field of Classification Search
CPC .............. H04B 1/1027; H04Q 11/0066; H01P 1/20345
USPC .......... 455/73, 562.1, 456.2, 426.1; 324/520, 324/76.39; 370/242, 252
See application file for complete search history.

(56) References Cited

U.S. PATENT DOCUMENTS

2010/0295533 A1  11/2010  Kuga et al.
2011/0237299 A1*  9/2011  Boss ...................... H01Q 1/246
                                                          455/562.1
2014/0002097 A1   1/2014  Yagi
(Continued)

FOREIGN PATENT DOCUMENTS

EP    2712098    3/2014

OTHER PUBLICATIONS

International Bureau, "International Preliminary Report on Patentability from PCT Application No. PCT/US2015/027022 dated Jun. 29, 2017", "from Foreign Counterpart of U.S. Appl. No. 62/093,822", Jun. 29, 2017, pp. 1-12.

(Continued)

*Primary Examiner* — Kiet M Doan
(74) *Attorney, Agent, or Firm* — Fogg & Powers LLC (57) ABSTRACT

The present disclosure describes various embodiments for detecting and/or localizing a passive intermodulation distortion signal in a radio frequency system having multiple transmit and/or receive paths.

26 Claims, 7 Drawing Sheets

(56) References Cited

U.S. PATENT DOCUMENTS

| | | |
|---|---|---|
| 2014/0119197 A1 | 5/2014 | Maca et al. |
| 2014/0146866 A1 | 5/2014 | Strachan et al. |
| 2015/0087242 A1* | 3/2015 | Bain ................ H04B 17/3913 |
| | | 455/73 |
| 2015/0318882 A1* | 11/2015 | Wyville ................ H04B 17/26 |
| | | 370/252 |

OTHER PUBLICATIONS

Patent Cooperation Treaty, "International Search Report from PCT Application No. PCT/US2015/027022 dated Sep. 17, 2015", "from Foreign Counterpart of U.S. Appl. No. 62/093,822", Sep. 17, 2015, pp. 1-12.

* cited by examiner

SYSTEM AND METHOD FOR PASSIVE INTERMODULATION SOURCE LOCALIZATION

RELATED AND CO-PENDING APPLICATIONS

This application claims priority to U.S. provisional application entitled "System and Method for Passive Intermodulation Source Localization", Ser. No. 62/093,822 filed 18 Dec. 2014, the entirety of which is hereby incorporated herein by reference.

BACKGROUND

Passive Intermodulation ("PIM") is a recognized problem in Radio Frequency ("RF") systems that can result in unintended performance degradation. PIM is a byproduct of RF signals interacting with each other in a system with at least one nonlinear component. The intermodulation interaction between two or more RF signals may result in additional signals formed at the sum and difference frequencies of the original signal frequencies as well as multiples of the sum and difference frequencies. The additional signals can unintentionally appear at frequencies that interfere with intentional signals. For this reason it is desirable to identify and eliminate PIM in most communication systems.

Examples of nonlinearities that may create PIM products include, but are not limited to: loose or misaligned RF connector junctions, metallic flakes or shavings inside of RF connectors or cables, mismatched metallic connections between RF connector surfaces, contaminated surfaces due to dirt, water or oxidation, manufacturing or installation deficiencies damaging RF path components, and nearby objects including metallic guy wires, metal roofs, rusty metal, air conditioner units, etc.

Current systems and methods identify different ways to identify the presence of nonlinearities that may generate PIM interference. A common method describes actively exciting an RF system by two carrier wave ("CW") signals (i.e., tones). When these tones encounter a nonlinearity, additional intermodulation ("IM") products will typically be generated in the form of tones at new, different, frequencies. Typically the PIM products of most interest are those related to the original tones by the relationship:

$$f_n = \frac{n+1}{2}f_1 - \frac{n-1}{2}f_2$$

where:

$f_1$ and $f_2$ are test tones, where $f_1$ is a lower frequency than $f_2$;

$f_n$ is the resulting PIM product; and n is the IM order typically represented as n=±3, ±5, ±7, ±9, etc., for example $f_3=2*f_1-f_2$ is the frequency of the lower third order PIM product and $f_3=2*f_2-f_1$ is the upper third order PIM product.

The location of the PIM products are deterministic with the above equation and the presence of a nonlinearity generating the PIM products is typically determined by detecting the existence of at least one said PIM product frequency.

Once the presence of PIM is detected, it is typically desired to find the source and modify it to eliminate the PIM. Finding the PIM source (the nonlinear component) in a RF system is not always a trivial task and typically includes the investment of considerable time, money, and resources. Prior art describes methods of measuring time and phase delays between the transmitted test tones and the received PIM product. These delays can be used to estimate the distance the PIM source is from the test tone transmitter within the RF system path. These methods typically use one receive path to detect the PIM product and are limited by the time and/or phase resolution of the measurement equipment. Highly accurate measurements often require higher cost equipment.

Figure 1:
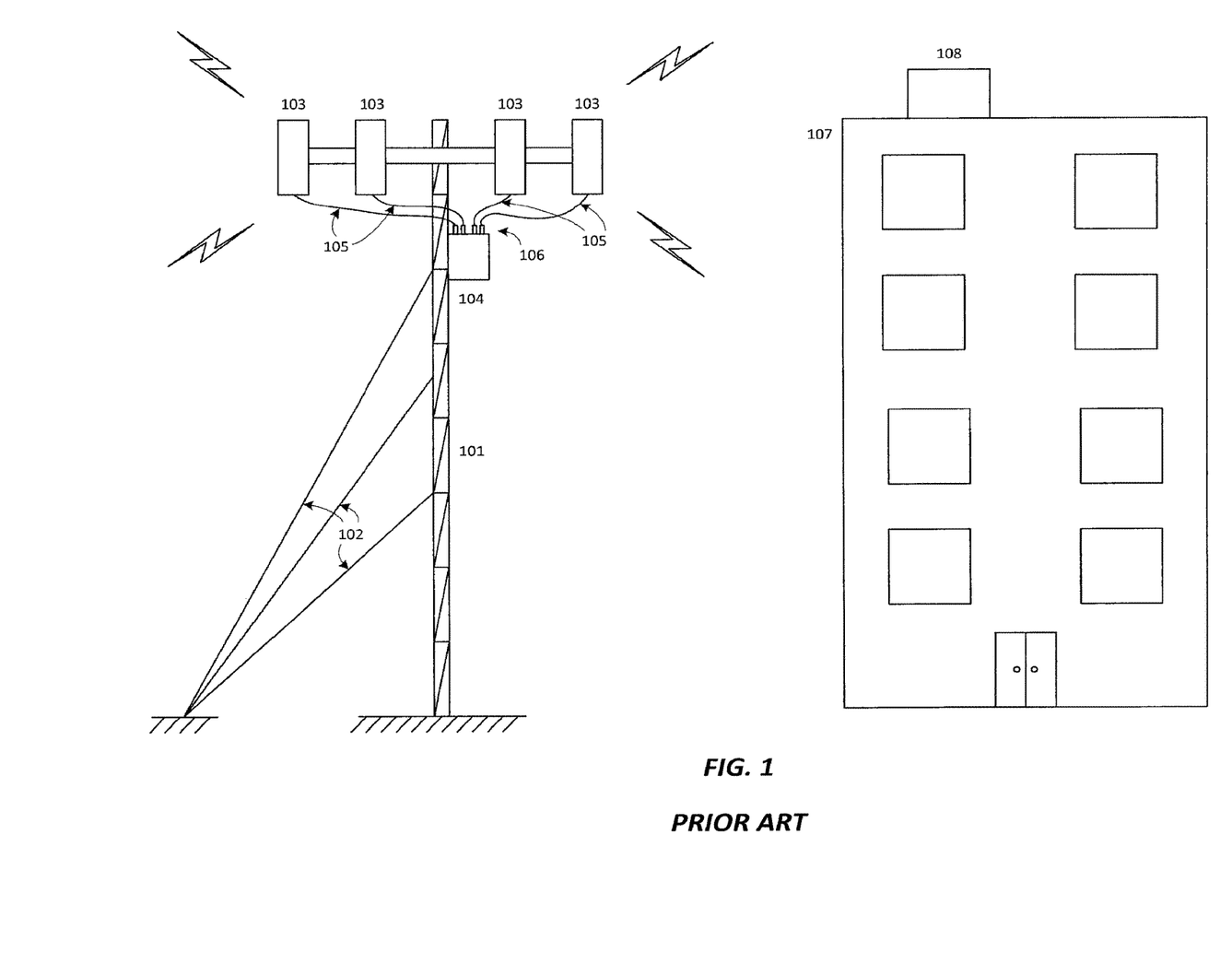
FIG. 1 is a notional drawing for a prior art RF radio tower system and potential PIM source locations.

Referring to FIG. 1, a notional drawing for a prior art RF radio tower system and potential PIM source locations is presented. RF radio tower 101 may be supported by guy wires 102 and support antennas 103. Each of the antennas 103 may be connected to a radio transceiver 104 via coaxial cables 105 and coax cable connectors 106. A building 107 may have disposed thereon metallic equipment 108, such as an air conditioning unit or other equipment. As described herein, some or all of these components may act as a source for passive intermodulation distortion. Other metallic objects that are typically in the vicinity of the tower system may include equipment mounting hardware, grounding systems, tower mounting hardware.

Accordingly, there is a need for systems, methods, and/or program products to detect and/or localize a source of passive intermodulation distortion. In an embodiment discussed in further detail below, a method is presented for localizing a source of passive intermodulation distortion, including injecting a signal into a transmit path of an antenna system in a radio frequency system, monitoring a plurality of receive paths of the antenna system, where a first of the receive paths shares an electrical component with the transmit path, and where a second of the receive paths does not share any electrical component with the transmit path, detecting a passive intermodulation distortion product signal on at least one of the plurality of receive paths, and localizing a source of passive intermodulation distortion as being internal or external to the radio frequency system based on the detection of at least one passive intermodulation distortion product signal on the at least one of the plurality of receive paths.

In another embodiment for localizing a source of passive intermodulation distortion, a signal is injected into a first transmit path of an antenna system in a radio frequency system, where the radio frequency system includes a first transmit/receive path comprising the first transmit path and a first receive path which each share a first electrical component, and a second transmit/receive path comprising a second transmit path and a second receive path which each share a second electrical component, and where the first and second transmit/receive paths do not share any electrical components between them, monitoring the first and second receive paths, detecting a passive intermodulation distortion product signal on at least one of the first and second receive paths, and localizing a source of passive intermodulation distortion as being internal or external to the radio frequency system based on the detection of a passive intermodulation distortion product signal on at least one of the first and second receive paths.

In a further embodiment, a non-transitory machine-readable medium is disclosed having stored thereon a plurality of executable instructions to inject a signal into a transmit path of an antenna system in a radio frequency system, monitor a plurality of receive paths of said antenna system, where a first of the receive paths shares an electrical component with the transmit path, and where a second of the receive paths does not share any electrical component with the transmit path, detect a passive intermodulation distortion product signal on at least one of the plurality of receive paths, and localize a source of passive intermodulation distortion as being internal or external to the radio frequency system based on the detection of at least one passive intermodulation distortion product signal on the at least one of the plurality of receive paths.

In yet a further embodiment, A non-transitory machine-readable medium is disclosed having stored thereon a plurality of executable instructions to inject a signal into a first transmit path of an antenna system in a radio frequency system, where the radio frequency system includes a first transmit/receive path comprising the first transmit path and a first receive path which each share a first electrical component, and a second transmit/receive path comprising a second transmit path and a second receive path which each share a second electrical component, and where the first and second transmit/receive paths do not share any electrical components between them, monitor the first and second receive paths, detect a passive intermodulation distortion product signal on at least one of the first and second receive paths, and localize a source of passive intermodulation distortion as being internal or external to the radio frequency system based on the detection of a passive intermodulation distortion product signal on at least one of the first and second receive paths.

Still other embodiments are contemplated wherein systems, circuitry, and/or apparatus are employed to accomplish the localization of a source of passive intermodulation distortion as described herein.

DETAILED DESCRIPTION

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference specific RF systems, it is to be understood that the discussion is not intended to limit the scope of the present subject matter in any way and that the principles presented are equally applicable to other RF systems.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of a system and method for detecting and localizing a source of passive intermodulation distortion in an RF system are described.

The present disclosure describes novel systems and methods for detecting and/or localizing a source of passive intermodulation distortion. Testing for PIM is of primary concern in RF systems, such as, but not limited to, cellular radio systems. Certain embodiments described herein disclose novel systems, methods, and program products for determining if PIM is being caused by a nonlinearity in the RF path "behind" the antenna (i.e., "internal" to the RF system) or by an external source in "front" of the antenna (i.e., "external" to the RF system).

Typical RF systems usually have more than one transmit and/or receive and/or transceive antenna paths for improved signal reception to thereby increase overall system performance. Certain embodiments make use of these multiple transmit and/or receive and/or transceive paths and do not require sophisticated measurement equipment with high time and/or phase resolution as do prior art solutions. These embodiments exploit the existence of those multiple signal paths to determine, in cases where PIM is present, if the PIM source is internal to the RF distribution system, or external to the system. Internal components that could contain PIM sources may include, but are not limited to, the coax cables carrying an RF signal, coax connectors, other electrical connectors, antennas, radio transceivers, etc. External components may include, but are not limited to, the tower, tower mounting hardware, tower support structures, nearby equipment, nearby structures, etc.

In one embodiment, a PIM test signal is transmitted into a single transmit antenna path of an antenna system. Multiple receive antenna paths of the RF system are then monitored to look for PIM product signals. In an embodiment, at least one of the multiple receive paths share components (e.g. coax cable, connectors, antenna, etc.) with the transmit path and at least one of the multiple receive paths do not share components with the transmit path. If PIM products are detected only on the receive path(s) shared with the transmit path, it is logical to ascertain that the PIM source is internal to the RF distribution system. If PIM products are detected at comparable signal levels on both the shared receive path(s) as well as the non-shared receive path(s), it is logical to ascertain that the PIM source is external to the RF distribution system.

In another embodiment, systems where all receive paths are shared with transmit paths may still be used to determine if the PIM source is internal or external to the RF distribution system. In such a case, the PIM test transmit signals are sent only on one of the transmit paths at a time. All receive paths are monitored for PIM products. If PIM products are detected only on the receive path shared with the transmit path on which the PIM test signals have been transmitted, then the PIM source is determined to be local to that path.

In yet another embodiment, a similar methodology is applied to a passive system where test tones are not actively transmitted. In this case, alternate signals (e.g., the base station downlink signal) or the receive noise floor may be used for testing. In either case the receive band is compared between multiple receive antennas. If PIM products from an alternate signal, or a noise floor rise caused by a PIM source, is viewed on multiple receive paths, then the PIM source is determined to be external to the RF distribution system.

The embodiments described herein are applicable to PIM test transmit signals that are CW (carrier wave) tones, or are a modulated signal. Additionally, embodiments described herein apply to remote radio head architectures where testing may be accomplished via a connection to a fiber optic cable, or a traditional tower coax architecture where testing may be accomplished via a connection to a coax cable.

Those of skill in the art will readily understand that any method of determining the presence of a PIM product signal is applicable to the described embodiments. These methods include, but are not limited to, peak detection, noise floor elevation, spectral shape comparison, error vector magnitude degradation, and key performance indicators such as bit error rate, signal to noise ratio, etc.

Figure 2:
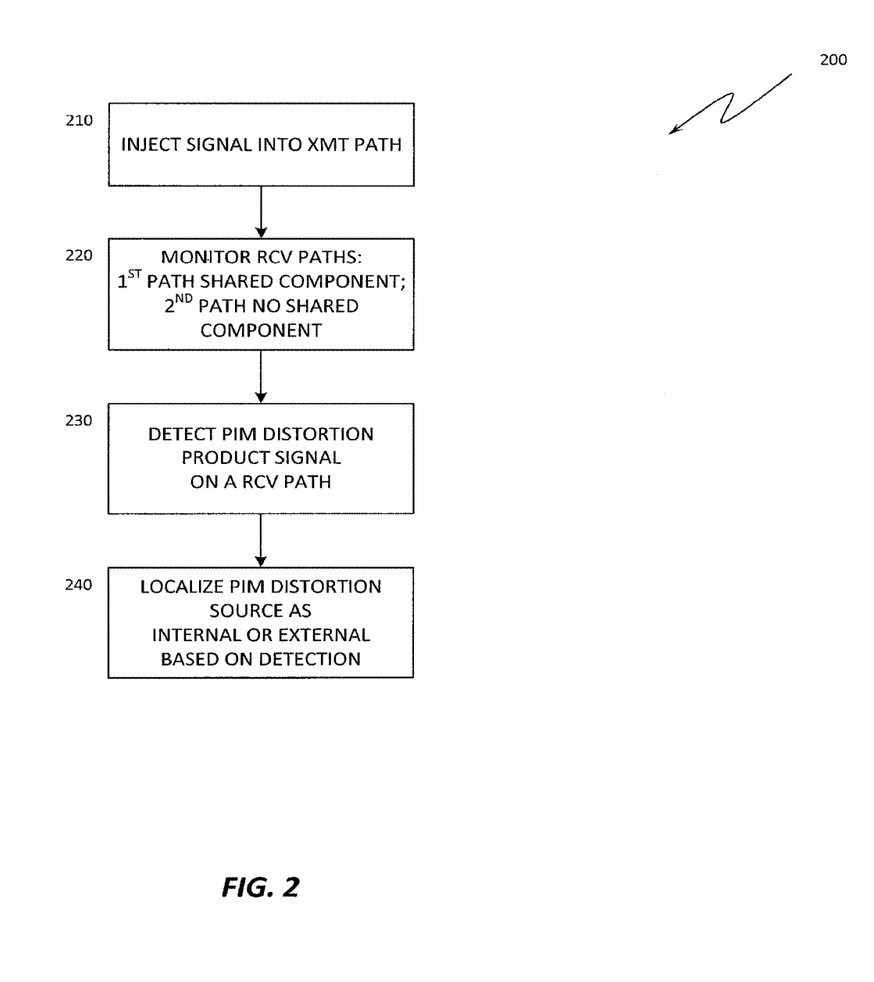
FIG. 2 is a flow diagram for detecting and localizing a source of passive intermodulation distortion according to an embodiment of the present subject matter.

With attention drawn to FIG. 2, a flow diagram 200 is presented for a method for detecting and localizing a source of passive intermodulation distortion according to an embodiment of the present subject matter. At block 210, a signal is injected into a transmit path of an antenna system in a radio frequency system. In certain embodiments, the injected signal may be a tone, a passive intermodulation distortion test signal, a downlink signal for the radio frequency system, a signal representative of a receive noise floor for the radio frequency system, or combinations thereof. In embodiments, the antenna system includes a remote radio head. In embodiments, the signal is injected into a fiber optic cable or a coaxial cable. In embodiments, the radio frequency system is a wireless communication system.

At block 220, multiple receive paths of the antenna system are monitored, where a first of the multiple receive paths shares at least one electrical component with the transmit path into which the signal was injected. A second of the multiple receive paths does not share any electrical component with the transmit path. While only two receive paths are discussed in this example, one of skill in the art will understand that more than two receive paths may be monitored simultaneously. In an embodiment, the monitoring of the multiple receive paths includes connecting a monitoring device to a fiber optic cable or to a coaxial cable in one or more of the monitored receive paths.

At block 230, a passive intermodulation distortion product signal is detected on at least one of the multiple monitored receive paths. In embodiments, detecting a passive intermodulation distortion product signal on a receive path may include a determination of a parameter such as a peak signal level, a noise floor evaluation, a spectral shape comparison, an error vector magnitude degradation, a signal-to-noise ratio, cyclostationary signal property detection, and a quality of service metric.

The detection of a passive intermodulation distortion product signal may be enhanced by determining a frequency for the passive intermodulation distortion product signal using the equation:

$$f_n = \frac{n+1}{2}f_1 - \frac{n-1}{2}f_2$$

where:

$f_1$ and $f_2$ are test tones, where $f_1$ is a lower frequency than $f_2$;

$f_n$ is the resulting PIM product; and n is the IM order typically represented as n=±3, ±5, ±7, ±9, etc., for example $f_3=2*f_1-f_2$ is the frequency of the lower third order PIM product and $f_3=2*f_2-f_1$ is the upper third order PIM product.

At block 240, a source of passive intermodulation distortion may be localized as being internal or external to the radio frequency system based on the detection of at least one passive intermodulation distortion product signal on at least one of the multiple monitored receive paths.

In an embodiment, the methodology described with respect to FIG. 2 may be stored on a non-transitory machine-readable medium as a plurality of executable instructions, the plurality of instructions comprising instructions to inject a signal into a transmit path of an antenna system in a radio frequency system, monitor multiple receive paths of the antenna system, where a first of the receive paths shares an electrical component with the transmit path, and where a second of the receive paths does not share any electrical component with the transmit path, detect a passive intermodulation distortion product signal on at least one of the multiple receive paths, and localize a source of passive intermodulation distortion as being internal or external to the radio frequency system based on the detection of at least one passive intermodulation distortion product signal on at least one of the multiple receive paths.

Figure 3:
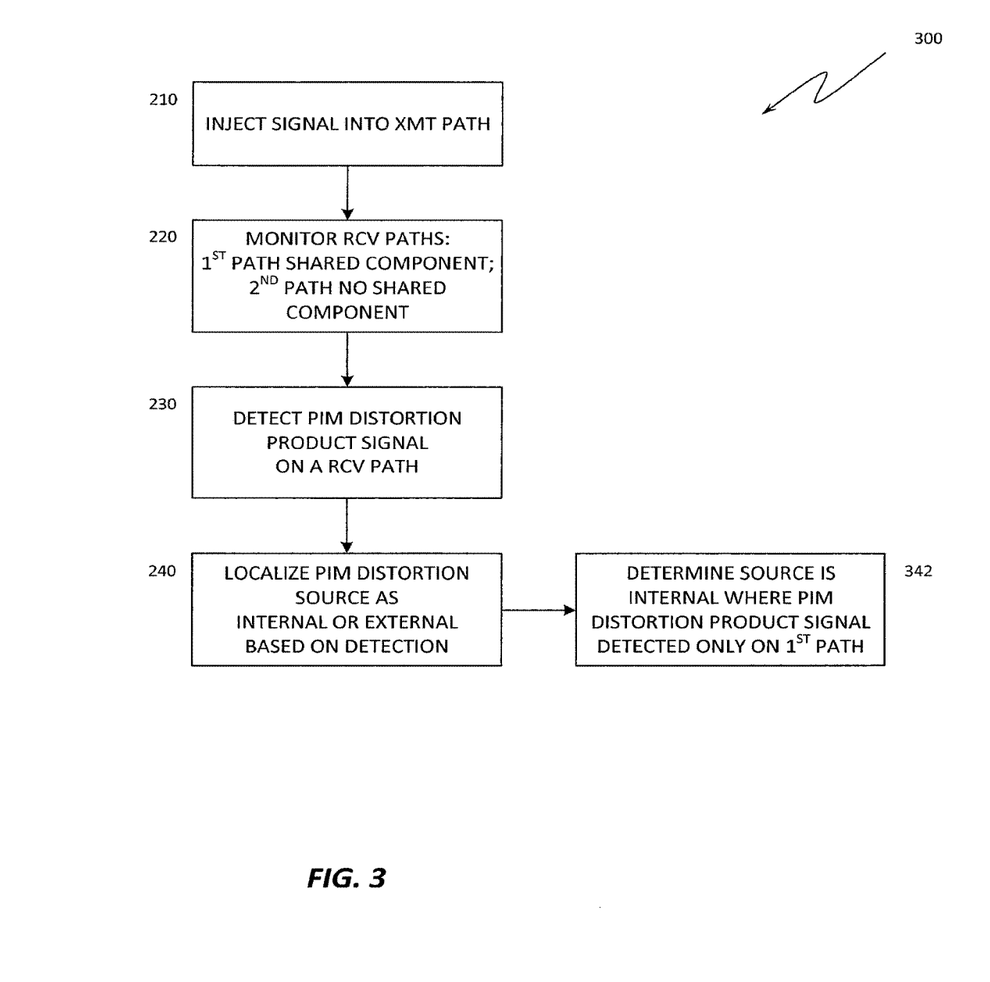
FIG. 3 is a flow diagram for determining if the source in FIG. 2 is internal to an RF system according to an embodiment of the present subject matter.

Now turning to FIG. 3, a flow diagram 300 is presented for determining if the source of passive intermodulation distortion from FIG. 2 is internal to the RF system, according to an embodiment of the present subject matter. Blocks 210, 220, 230, and 240 are as described above with respect to FIG. 2. At block 342, localizing the source of passive intermodulation distortion includes the determination that the source of passive intermodulation distortion is internal to the radio frequency system if the passive intermodulation distortion product signal is detected only on the first receive path, i.e., the path in block 220 that shares at least one component with the transmit path into which the signal was injected.

The internal source of passive intermodulation distortion may then be further isolated to, as a non-limiting example, a component in the transmit path, a connector in the transmit path, a cabling run of the transmit path, a transmit antenna of the antenna system, and/or a radio transceiver in the transmit path.

Figure 4:
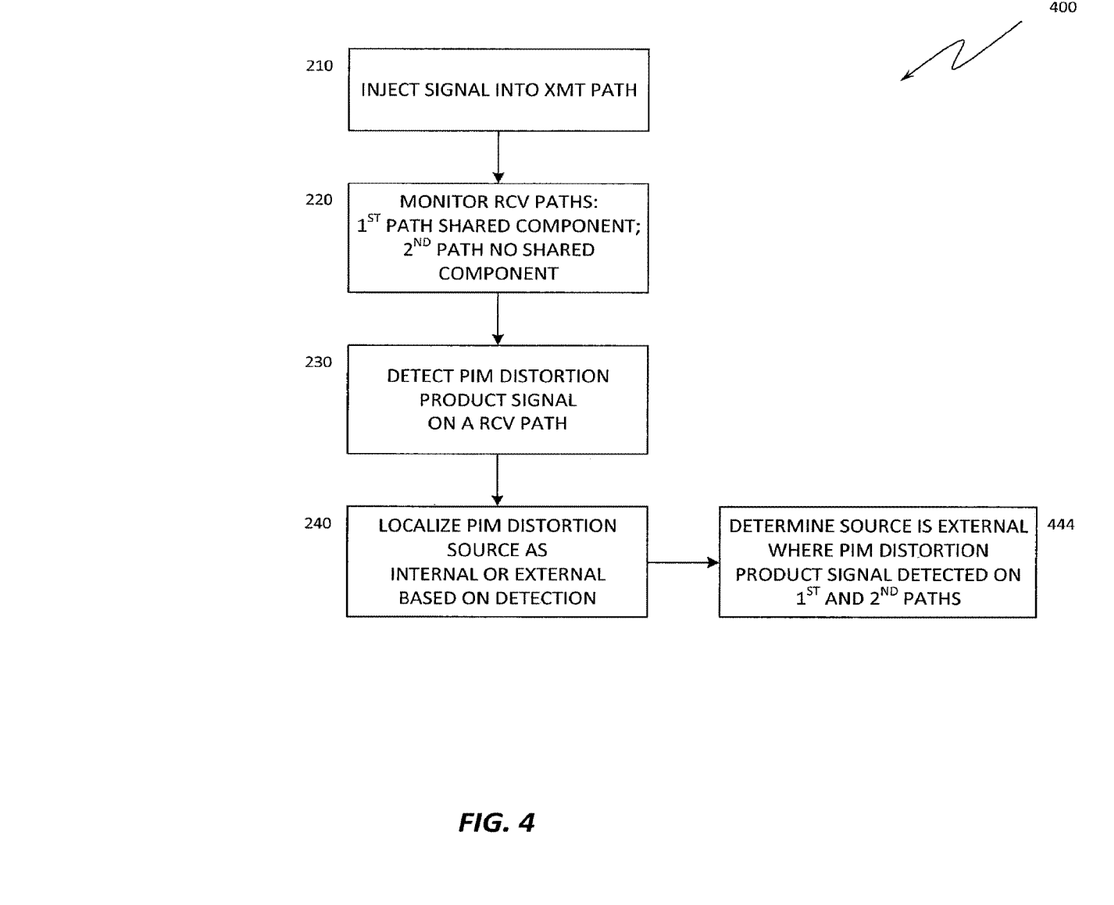
FIG. 4 is a flow diagram for determining if the source in FIG. 2 is external to an RF system according to an embodiment of the present subject matter.

FIG. 4 illustrates a flow diagram 400 for determining if the source of passive intermodulation distortion from FIG. 2 is external to the RF system, according to an embodiment of the present subject matter. Blocks 210, 220, 230, and 240 are as described above with respect to FIG. 2. At block 444, localizing the source of passive intermodulation distortion includes the determination that the source of passive intermodulation distortion is external to the radio frequency system if the passive intermodulation distortion product signal is detected on both the first (i.e., with shared components) and the second (i.e., with no shared component) receive paths. In an embodiment, this may be determined by the signal level of a passive intermodulation distortion product signal detected on the first receive path being comparable to the signal level of a passive intermodulation distortion product signal detected on the second receive path.

The external source of passive intermodulation distortion may then be further isolated to, as a non-limiting example, a tower supporting the antenna system, mounting hardware for the tower, a metallic guy wire supporting the tower, a structure located in proximity to the tower, and/or a piece of metallic equipment located in proximity to the tower.

Figure 5:
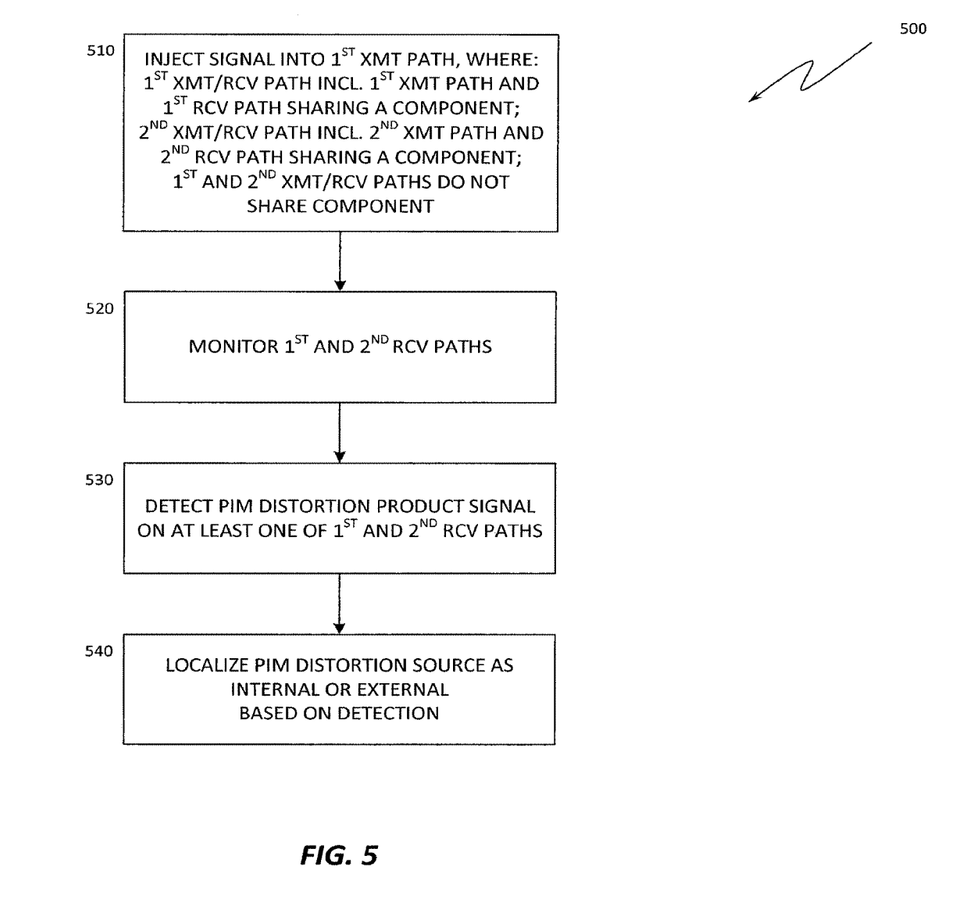
FIG. 5 is a flow diagram for detecting and localizing a source of passive intermodulation distortion according to an embodiment of the present subject matter.

Considering FIG. 5, a flow diagram 500 is presented for detecting and localizing a source of passive intermodulation distortion according to an embodiment of the present subject matter. At block 510, a signal is injected into a first transmit path of an antenna system in a radio frequency system, where the radio frequency system includes a first transmit/receive path which includes the first transmit path and a first receive path which each share a first electrical component, and a second transmit/receive path which includes a second transmit path and a second receive path which each share a second electrical component. The first and second transmit/receive paths do not share any electrical components between them. In certain embodiments, the injected signal may be a tone, a passive intermodulation distortion test signal, a downlink signal for the radio frequency system, a signal representative of a receive noise floor for the radio frequency system, or combinations thereof. In embodiments, the antenna system includes a remote radio head. In embodiments, the signal is injected into a fiber optic cable or a coaxial cable. In embodiments, the radio frequency system is a wireless communication system.

At block 520, multiple receive paths of the antenna system are monitored, including the first receive path and the second receive path mentioned above. While only two receive paths are discussed in this example, one of skill in the art will understand that more than two receive paths may be monitored simultaneously. In an embodiment, the monitoring of the multiple receive paths includes connecting a monitoring device to a fiber optic cable or to a coaxial cable in one or more of the monitored receive paths.

At block 530, a passive intermodulation distortion product signal is detected on at least one of the first and second receive paths. In embodiments, detecting a passive intermodulation distortion product signal on a receive path may include a determination of a parameter such as a peak signal level, a noise floor evaluation, a spectral shape comparison, an error vector magnitude degradation, a signal-to-noise ratio, cyclostationary signal property detection, and a quality of service metric.

As discussed above, the detection of a passive intermodulation distortion product signal may be enhanced by determining a frequency for the passive intermodulation distortion product signal using the equation:

$$f_n = \frac{n+1}{2}f_1 - \frac{n-1}{2}f_2$$

where:

$f_1$ and $f_2$ are test tones, where $f_1$ is a lower frequency than $f_2$;

$f_n$ is the resulting PIM product; and n is the IM order typically represented as n=±3, ±5, ±7, ±9, etc., for example $f_3=2*f_1-f_2$ is the frequency of the lower third order PIM product and $f_{-3}=2*f_2-f_1$ is the upper third order PIM product.

At block 540, a source of passive intermodulation distortion may be localized as being internal or external to the radio frequency system based on the detection of a passive intermodulation distortion product signal on at least one of the first and second receive paths.

In an embodiment, the methodology described with respect to FIG. 5 may be stored on a non-transitory machine-readable medium as a plurality of executable instructions, the plurality of instructions comprising instructions to inject a signal into a first transmit path of an antenna system in a radio frequency system, where the radio frequency system includes a first transmit/receive path including the first transmit path and a first receive path which each share a first electrical component, and a second transmit/receive path including a second transmit path and a second receive path which each share a second electrical component, and where the first and second transmit/receive paths do not share any electrical components between them, monitor the first and second receive paths, detect a passive intermodulation distortion product signal on at least one of the first and second receive paths, and localize a source of passive intermodulation distortion as being internal or external to the radio frequency system based on the detection of a passive intermodulation distortion product signal on at least one of the first and second receive paths.

Figure 6:
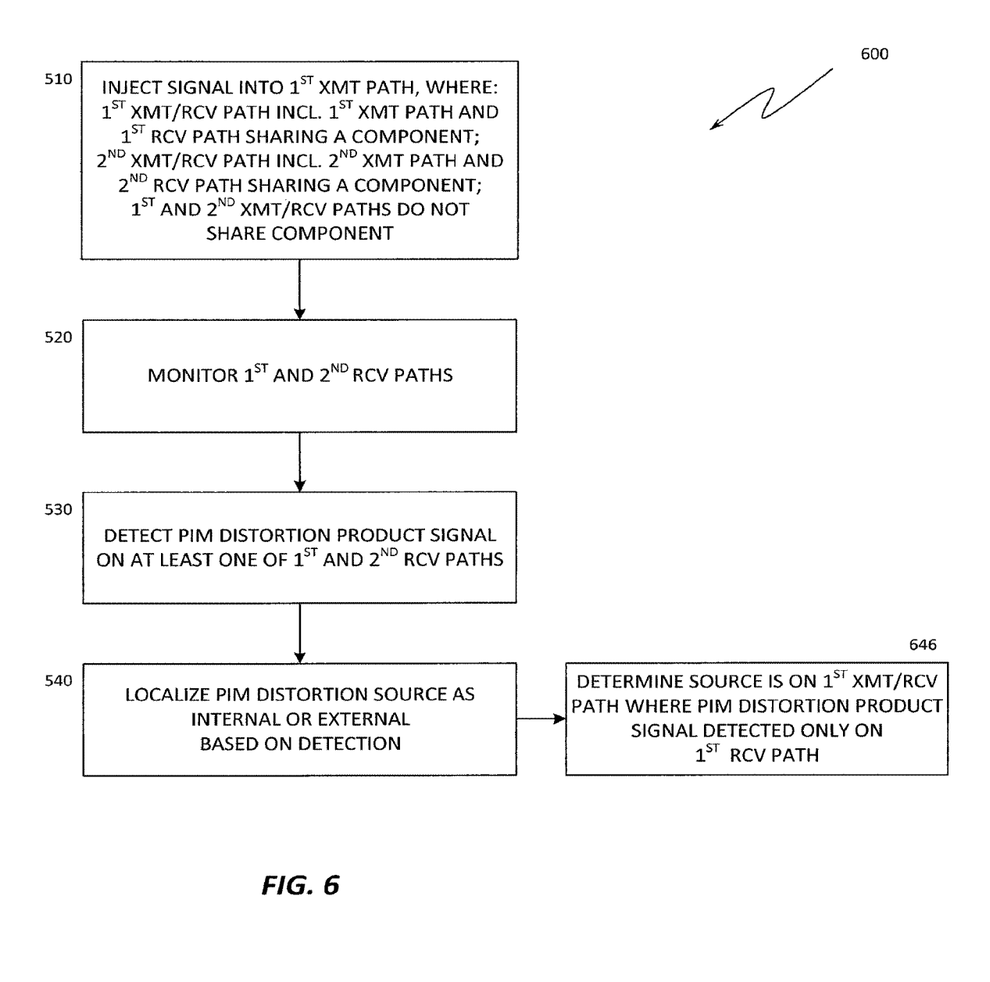
FIG. 6 is a flow diagram for determining if the source in FIG. 5 is internal on a particular transmit/receive path of an RF system according to an embodiment of the present subject matter.

Now considering FIG. 6, a flow diagram 600 is presented for determining if the source of passive intermodulation distortion from FIG. 5 is on a particular transmit/receive path of the RF system, according to an embodiment of the present subject matter. Blocks 510, 520, 530, and 540 are as described above with respect to FIG. 5. At block 646, localizing the source of passive intermodulation distortion includes determining that the source of passive intermodulation distortion is on the first transmit/receive path if the passive intermodulation distortion product signal is detected only on the first receive path, i.e., the path in block 520 into which the signal was injected.

The internal source of passive intermodulation distortion may then be further isolated to a component in the transmit path, a connector in the transmit path, a cabling run of the transmit path, a transmit antenna of the antenna system, and/or a radio transceiver in the transmit path.

Figure 7:
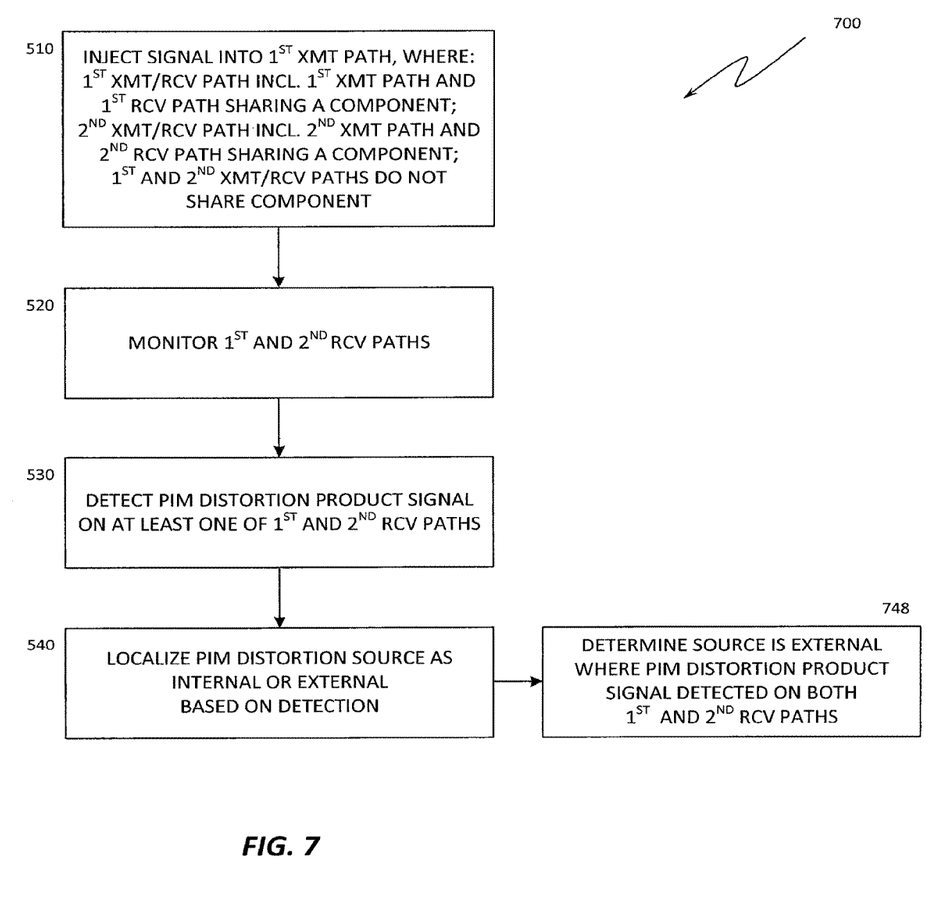
FIG. 7 is a flow diagram for determining if the source in FIG. 5 is external to an RF system according to an embodiment of the present subject matter.

FIG. 7 shows a flow diagram 700 for determining if the source of passive intermodulation distortion from FIG. 5 is external to the RF system, according to an embodiment of the present subject matter. Blocks 510, 520, 530, and 540 are as described above with respect to FIG. 5. At block 748, localizing the source of passive intermodulation distortion includes determination that the source of passive intermodulation distortion is external to the radio frequency system if the passive intermodulation distortion product signal is detected on both the first and the second receive paths. In an embodiment, this may be determined by the signal level of the passive intermodulation distortion product signal detected on the first receive path being comparable to a signal level of the passive intermodulation distortion product signal detected on the second receive path.

The external source of passive intermodulation distortion may then be further isolated to, as a non-limiting example, a tower supporting the antenna system, mounting hardware for the tower, a metallic guy wire supporting the tower, a structure located in proximity to the tower, and/or a piece of metallic equipment located in proximity to the tower.

Certain embodiments of the present disclosure may be implemented by a computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method for localizing a source of passive intermodulation distortion, the method comprising the steps of:
    (a) injecting a signal into a transmit path of an antenna system in a radio frequency system;
    (b) monitoring a plurality of receive paths of said antenna system, wherein a first of the receive paths shares an electrical component with the transmit path, and wherein a second of the receive paths does not share any electrical component with the transmit path;

(c) detecting a passive intermodulation distortion product signal on at least one of the plurality of receive paths; and (d) determining the location of a source of passive intermodulation distortion as being internal or external to the radio frequency system based on the detection of at least one passive intermodulation distortion product signal on at least one of the first and second receive paths of the plurality of receive paths;

wherein the signal is selected from the group consisting of: a tone, a passive intermodulation distortion test signal, a downlink signal for the radio frequency system, a signal representative of a receive noise floor for the radio frequency system, and combinations thereof.

2. The method of claim 1 wherein the step of determining the location of a source of passive intermodulation distortion includes determining that the source of passive intermodulation distortion is internal to the radio frequency system for the condition where the passive intermodulation distortion product signal is detected only on the first receive path.

3. The method of claim 1 wherein the step of determining the location of a source of passive intermodulation distortion includes determining that the source of passive intermodulation distortion is external to the radio frequency system for the condition where the passive intermodulation distortion product signal is detected on both the first and the second receive paths.

4. The method of claim 3 wherein a signal level of the passive intermodulation distortion product signal detected on the first receive path is comparable to a signal level of the passive intermodulation distortion product signal detected on the second receive path.

5. The method of claim 1 wherein said antenna system includes a remote radio head.

6. The method of claim 1 wherein the signal is injected into a fiber optic cable or a coaxial cable.

7. The method of claim 1 wherein said radio frequency system is a wireless communication system.

8. The method of claim 1 wherein the step of monitoring a plurality of receive paths includes connecting a monitoring device to a fiber optic cable or a coaxial cable in one of the plurality of receive paths.

9. The method of claim 1 wherein the step of detecting a passive intermodulation distortion product signal includes a determination of a parameter selected from the group consisting of: a peak signal level, a noise floor evaluation, a spectral shape comparison, an error vector magnitude degradation, a signal-to-noise ratio, cyclostationary signal property detection, and a quality of service metric.

10. The method of claim 1 wherein a frequency for the passive intermodulation distortion product signal is determined from the equation:

$$f_n = \frac{n+1}{2}f_1 + \frac{n-1}{2}f_2$$

where: $f_1$ and $f_2$ are frequencies of a first and second test tone, which together comprise the signal injected into the transmit path, where $f_1 < f_2$,
n is an intermodulation order, and
$f_n$ is the frequency of the passive intermodulation distortion product signal.

11. The method of claim 1 wherein the internal source of passive intermodulation distortion is selected from the group consisting of: a component in the transmit path, a connector in the transmit path, a cabling run of the transmit path, a transmit antenna of the antenna system, and a radio transceiver in the transmit path.

12. The method of claim 1 wherein the external source of passive intermodulation distortion is selected from the group consisting of: a tower supporting the antenna system, mounting hardware for the tower, a metallic guy wire supporting the tower, a structure located in proximity to the tower, and a piece of metallic equipment located in proximity to the tower.

13. A method for localizing a source of passive intermodulation distortion, the method comprising the steps of:

(a) injecting a signal into a first transmit path of an antenna system in a radio frequency system, wherein said radio frequency system includes a first transmit/receive path comprising the first transmit path and a first receive path which each share a first electrical component, and a second transmit/receive path comprising a second transmit path and a second receive path which each share a second electrical component, and wherein the first and second transmit/receive paths do not share any electrical components between them;

(b) monitoring the first and second receive paths;

(c) detecting a passive intermodulation distortion product signal on at least one of the first and second receive paths; and (d) determining the location of a source of passive intermodulation distortion as being internal or external to the radio frequency system based on the detection of a passive intermodulation distortion product signal on at least one of the first and second receive paths;

wherein the signal is selected from the group consisting of: a tone, a passive intermodulation distortion test signal, a downlink signal for the radio frequency system, a signal representative of a receive noise floor for the radio frequency system, and combinations thereof.

14. The method of claim 13 wherein the step of determining the location of the source of passive intermodulation distortion includes determining that the source of passive intermodulation distortion is on the first transmit/receive path for the condition where the passive intermodulation distortion product signal is detected only on the first receive path.

15. The method of claim 13 wherein the step of determining the location of a source of passive intermodulation distortion includes determining that the source of passive intermodulation distortion is external to the radio frequency system for the condition where the passive intermodulation distortion product signal is detected on both the first and second receive paths.

16. The method of claim 15 wherein a signal level of the passive intermodulation distortion product signal detected on the first receive path is comparable to a signal level of the passive intermodulation distortion product signal detected on the second receive path.

17. The method of claim 13 wherein said antenna system includes a remote radio head.

18. The method of claim 13 wherein the signal is injected into a fiber optic cable or a coaxial cable.

19. The method of claim 13 wherein said radio frequency system is a wireless communication system.

20. The method of claim 13 wherein the step of monitoring the first and second receive paths includes connecting a monitoring device to a fiber optic cable or a coaxial cable in the first receive path.

21. The method of claim 13 wherein the step of detecting a passive intermodulation distortion product signal includes a determination of a parameter selected from the group consisting of: a peak signal level, a noise floor evaluation, a spectral shape comparison, an error vector magnitude degradation, a signal-to-noise ratio, cyclostationary signal property detection, and a quality of service metric.

22. The method of claim 13 wherein a frequency for the passive intermodulation distortion product signal is determined from the equation:

$$f_n = \frac{n+1}{2}f_1 + \frac{n-1}{2}f_2$$

where: $f_1$ and $f_2$ are frequencies of a first and second test tone, which together comprise the signal injected into the transmit path, where $f_1 < f_2$,
n is an intermodulation order, and
$f_n$ is the frequency of the passive intermodulation distortion product signal.

23. The method of claim 13 wherein the internal source of passive intermodulation distortion is selected from the group consisting of: a component in the transmit path, a connector in the transmit path, a cabling run of the transmit path, a transmit antenna of the antenna system, and a radio transceiver in the transmit path.

24. The method of claim 13 wherein the external source of passive intermodulation distortion is selected from the group consisting of: a tower supporting the antenna system, mounting hardware for the tower, a metallic guy wire supporting the tower, a structure located in proximity to the tower, and a piece of metallic equipment located in proximity to the tower.

25. A non-transitory machine-readable medium having stored thereon a plurality of executable instructions, the plurality of instructions comprising instructions to:
(a) inject a signal into a transmit path of an antenna system in a radio frequency system;
(b) monitor a plurality of receive paths of said antenna system, wherein a first of the receive paths shares an electrical component with the transmit path, and wherein a second of the receive paths does not share any electrical component with the transmit path;
(c) detect a passive intermodulation distortion product signal on at least one of the plurality of receive paths; and
(d) determine the location of a source of passive intermodulation distortion as being internal or external to the radio frequency system based on the detection of at least one passive intermodulation distortion product signal on at least one of the first and second receive paths of the plurality of receive paths;
wherein the signal is selected from the group consisting of: a tone, a passive intermodulation distortion test signal, a downlink signal for the radio frequency system, a signal representative of a receive noise floor for the radio frequency system, and combinations thereof.

26. A non-transitory machine-readable medium having stored thereon a plurality of executable instructions, the plurality of instructions comprising instructions to:
(a) inject a signal into a first transmit path of an antenna system in a radio frequency system, wherein said radio frequency system includes a first transmit/receive path comprising the first transmit path and a first receive path which each share a first electrical component, and a second transmit/receive path comprising a second transmit path and a second receive path which each share a second electrical component, and wherein the first and second transmit/receive paths do not share any electrical components between them;
(b) monitor the first and second receive paths;
(c) detect a passive intermodulation distortion product signal on at least one of the first and second receive paths; and
(d) determine the location of a source of passive intermodulation distortion as being internal or external to the radio frequency system based on the detection of a passive intermodulation distortion product signal on at least one of the first and second receive paths;
wherein the signal is selected from the group consisting of: a tone, a passive intermodulation distortion test signal, a downlink signal for the radio frequency system, a signal representative of a receive noise floor for the radio frequency system, and combinations thereof.

* * * * *